Oct. 22, 1963  G. B. SCHICK ETAL  3,107,938
PRESSURE SENSITIVE RELEASE MECHANISM
Filed Dec. 4, 1961

INVENTORS
JOHN D. ISAACS
GEORGE B. SCHICK
BY
ATTORNEYS

United States Patent Office 3,107,938
Patented Oct. 22, 1963

3,107,938
PRESSURE SENSITIVE RELEASE MECHANISM
George B. Schick, 626 2nd St., Del Mar, Calif., and
John D. Isaacs, La Orilla and Puente, Rancho, Calif.
Filed Dec. 4, 1961, Ser. No. 156,879
4 Claims. (Cl. 294—83)

The present invention relates to a pressure actuated release mechanism and more particularly to mechanism for releasing a load carried thereby to a predetermined level due to the difference in fluid pressure within the mechanism and the environment pressure.

The present invention may be employed in any environment wherein the pressure of the environment changes. One such condition occurs due to increase in water pressure upon lowering the mechanism in the water. The present invention therefore is illustrated as one for releasing a load after the load has been lowered to a predetermined depth in water.

The mechanism of the present invention comprises, generally two plates which are movable toward and away from one another. In the preferred embodiment they are hinged to one another. These two plates are provided with complementing, confronting surfaces which are adapted to be brought into sealing engagement with one another. A load retainer is maintained closed when the plates are in sealing relationship with one another, and the retainer is opened when the plates separate from one another.

One of the plates is provided with an opening therethrough leading to the area between the plates. This opening is covered by a frangible element, such as thin metal to normally seal the aforementioned opening. The two plates and the frangible element form a closed chamber. When the differential in fluid pressure within the chamber and the environment attains a predetermined value, which value may be selected by selecting a seal having the desired fracture characteristic, the seal element will fracture.

When the fracture of the sealing element occurs, the plates will be separated to actuate the load retainer to release the load. In the preferred embodiment, the plates are provided with integral sections which cooperate to form the retainer when the plates are in sealing relationship with one another.

Other features and the advantages of the present invention will be apparent from the following description, reference being had to the accompanying drawings wherein a preferred embodiment of the invention is illustrated.

Figure 1:
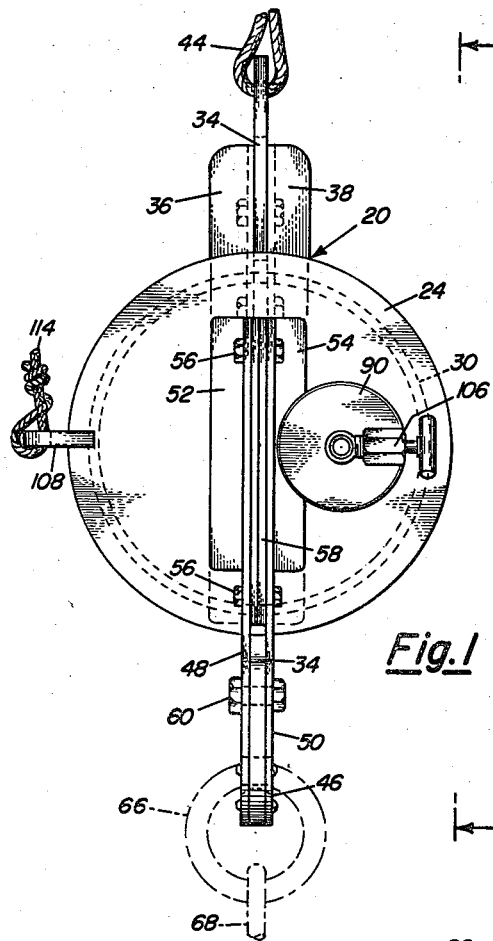
FIG. 1 is a view in elevation looking in the direction of arrow 1 of FIG. 2.

Referring more in detail to the drawing, the pressure release mechanism is shown generally at 20 including two plates 22 and 24, preferably in the form of discs. These plates are provided with confronting, complementing surfaces 26 and 28, respectively. Either of these plates may be provided with a concentric groove. Such concentric groove is shown at 30 in plate 24 for receiving an O-ring or other suitable gasket 32. This O-ring is used to seal the space between the two plates from the outside environment.

Plates 22 are connected with a bar 34 by two angle irons 36 and 38 through bolts 40. These angle irons are suitably welded to the outer side of the plate 22. The upper end of bar 34 is provided with a hole 42 for attaching the bar to a cable or cord 44. The lower end of the bar 34 terminates in a retainer section 46.

The plate 24 is connected to a pair of parallelly extending bars 48 and 50 through angle irons 52 and 54 which are suitably welded to the outside of plate 24. These bars 48 and 50 are attached to the angle irons 52 and 54 by bolts 56. A pair of spacer bars 58 are disposed between the bars 48 and 50, for maintaining said bar space from one another.

The lower end of the bar 34 extends through the space at the lower end of the bars 48, and 50 and the bars 34, 48, and 50 are pivotally connected to one another by a bolt 60. The lower end of the bars 48 and 50 are provided with a retainer section 62 which complements the retainer section 46 of the bar 38 to provide a loop, the hole in the loop being indicated by a numeral 64. This loop receives an upper end of a ring 66. The lower end of the ring carries a cord or cable 68. For convenience the complementing sections 46 and 62 may be considered as jaws for retaining the ring 66 in position.

Figure 2:
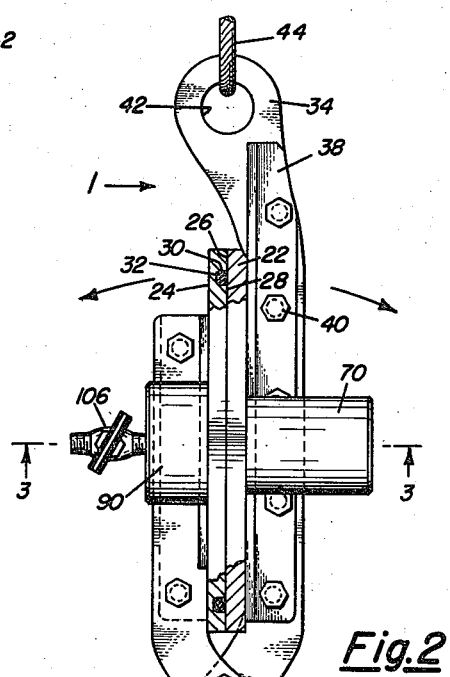
FIG. 2 is a view looking in the direction of arrows 2 of FIG. 1, parts thereof being shown in section.

From the foregoing it will be seen that when the plate 24 has been moved to a predetermined distance in a counterclockwise direction from that shown in FIG. 2, the jaws will be opened to release the ring 66.

Figures 3, 4:
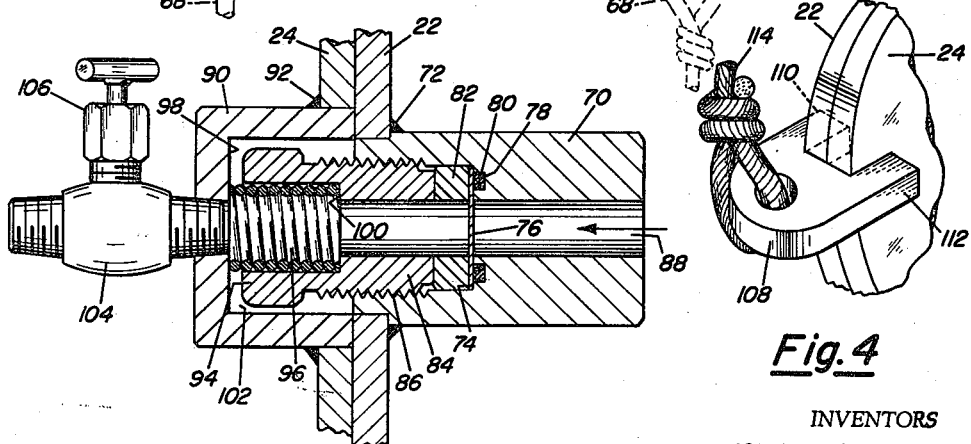
FIG. 3 is a fragmentary sectional view taken along line 3—3 of FIG. 2 but on a larger scale.
FIG. 4 is a fragmentary view of the mechanism in perspective showing a safety lock clip.

Referring more particularly to FIG. 3, it will be seen that the plate 22 since provided with an outwardly extending hollow boss 70, which is suitably welded to the plate 22 as at 72. This hollow boss is cylindrically counterbored to provide a shoulder 74 forming an abutment for a frangible disc 76. This shoulder is provided with an angular groove 78 for receiving a sealing O-ring 80. The frangible disc 76 is retained in sealing relationship with the O-ring 80 by a ring 82 which is forced against the disc 76 by a hollow nut or coupling 84 which is threaded into the hollow boss 70, the threads being shown at 86. The hollow boss 70 is provided with a passage 88 leading to the environment; thus it will be seen that the external surface 76 is exposed to environment fluid pressure.

The plate 24 is provided with an outwardly extending cup 90 which is welded as at 92 to the plate. This cup 90 is arranged opposite or concentrically with the hollow boss 70 on the plate 22 and surrounds the head end 94 of the coupling 84. A coil spring 96, under compression, is interposed between the plates 22 and 24, and, in the present embodiment is interposed between the inner end wall 98 of the cup 90 and an internal shoulder 100 in the coupling 84. This spring normally tends to separate the plate 24 from the plate 22. But it may not be necessary since the load applied through ring 66 also tends to separate the plates.

It will be observed from FIG. 3 that when the plate 24 is in sealing relationship with the plate 22, a closed chamber 102 is provided by the cup 90 and the frangible wall 76. In the present embodiment the plates 22 and 24 are retained in sealing relationship by maintaining the fluid pressure within the chamber 102 lower than the environment fluid pressure. Air can be withdrawn from the chamber 102 in any suitable manner; the chamber is herein shown as connected with coupling 104 which latter is connected with the source of low pressure. When the desired sub-pressure is attained in the chamber 102, the coupling is closed by a valve 106 to prevent the ingress of air to the chamber 102.

By selecting a frangible disc 76 having the desired characteristics to fracture when a predetermined pressure differential is attained on opposite sides thereof, then the ring 66 can be released at a selected pressure differential between the interior of the chamber 102 and the environment fluid pressure. It will be seen that when this selected differential in pressure occurs the frangible disc 76 will be fractured to equalize the fluid pressure within the chamber 102 with that of the environment fluid pressure. The spring 96 then causes the plates 22 and 24 to separate from one another, swinging about the pivot 60, and, when this occurs, the ring 66 will be released.

The present invention is particularly useful when it is desirable to measure or record the physical factors encountered at various depths, for example in the ocean. The instrument for measuring or recording these factors can be lowered to a predetermnied depth and then released, the release being effected when the pressure of the water on the frangible disc 76 attains a predetermined value. Obviously the depths at which release are effected, can be regulated by selecting discs which fracture at desirable pressure differentials on opposite sides thereof.

Only one expendable element is involved and that is the disc per se. Stainless steel discs are available rating at various wide ruptured pressures. Of course, other metals having different characteristics may be selected, depending upon the depth to which the pressure sensitive release mechanism is to function.

If desirable, a safety lock clip may be employed such as that shown in FIG. 4 at 108. It comprises a fork-like element having tines 110 and 112 which span and tightly embrace the two plates 22 and 24. A cable or rope 114 may be fastened to this fork 108 which when pulled pulls the fork tines away from the plates.

While the form of embodiment herein shown and described constitutes a preferred form, it is to be understood that other forms may be adopted falling within the scope of the claims that follow.

We claim:
1. A pressure sensitive releasing mechanism, comprising in combination:
 (A) a plate;
 (B) a second plate movable toward and away from said first plate,
  (1) said plates having confronting complement surfaces,
 (2) said plates having jaws cooperating to form a closed loop retainer for retaining apparatus to be released when said plates are in complementing and sealing engagement with one another, said retainer being opened by movement of the plates away from one another,
 (3) one of said plates having an opening therethrough;
 (C) a frangible element sealingly covering said opening,
  (4) said plates and frangible element forming a closed chamber when said surfaces of said plates are in complementing engagement with one another;
 (D) a sealing element between said plates and surrounding said chamber to seal said chamber,
  (5) one of said plates having a passage leading from the chamber for withdrawing air therefrom;
 (E) and means for closing said passage.

2. A pressure sensitive release mechanism as defined in claim 1, characterized to include:
 (F) means for pivotally connecting the plates with one another.

3. A pressure sensitive release mechanism as defined in claim 1, characterized to include:
 (h) resilient means normally biased to move said plates relative to one another.

4. A pressure sensitive release mechanism as defined in claim 1, characterized to include:
 (h) resilient means between said plates normally biased to separate said plates.

References Cited in the file of this patent
UNITED STATES PATENTS

| | | |
|---|---|---|
| 1,294,327 | Boston | Feb. 11, 1919 |
| 2,079,164 | Glab | May 4, 1937 |
| 2,824,315 | McKenny | Feb. 25, 1958 |
| 2,941,675 | Noble | June 21, 1960 |